United States Patent
Seo et al.

(10) Patent No.: US 12,173,109 B2
(45) Date of Patent: Dec. 24, 2024

(54) PREPARATION METHOD OF HYDROGENATED PETROLEUM RESIN

(71) Applicant: HANWHA SOLUTIONS CORPORATION, Seoul (KR)

(72) Inventors: Sangho Seo, Daejeon (KR); Keedo Han, Daejeon (KR); Pilje Seong, Daejeon (KR); Dong Il Shin, Daejeon (KR); Bong Sik Jeon, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 543 days.

(21) Appl. No.: 17/615,885

(22) PCT Filed: Jun. 2, 2020

(86) PCT No.: PCT/KR2020/007110
§ 371 (c)(1),
(2) Date: Dec. 2, 2021

(87) PCT Pub. No.: WO2020/246765
PCT Pub. Date: Dec. 10, 2020

(65) Prior Publication Data
US 2022/0325011 A1  Oct. 13, 2022

(30) Foreign Application Priority Data

Jun. 3, 2019 (KR) .................. 10-2019-0065352
Jun. 1, 2020 (KR) .................. 10-2020-0065848

(51) Int. Cl.
| | | |
|---|---|---|
| *C08F 8/04* | (2006.01) | |
| *B01J 21/08* | (2006.01) | |
| *B01J 23/755* | (2006.01) | |
| *B01J 35/30* | (2024.01) | |
| *B01J 35/40* | (2024.01) | |
| *C09J 145/00* | (2006.01) | |

(52) U.S. Cl.
CPC .............. *C08F 8/04* (2013.01); *B01J 21/08* (2013.01); *B01J 23/755* (2013.01); *B01J 35/393* (2024.01); *B01J 35/40* (2024.01); *C09J 145/00* (2013.01)

(58) Field of Classification Search
CPC ... C08F 8/04; C08F 2/01; C08F 240/00; B01J 21/08; B01J 23/755; B01J 35/393; B01J 37/0201; B01J 35/647; B01J 37/16; B01J 37/18; B01J 37/20; B01J 37/031; B01J 37/06; B01J 37/08; B01J 35/40; B01J 35/615; C09J 157/02; C09J 145/00; C09J 125/02
See application file for complete search history.

(56) References Cited

U.S. PATENT DOCUMENTS

| | | | |
|---|---|---|---|
| 4,328,090 A | 5/1982 | Stuckey, Jr. et al. | |
| 4,629,766 A | 12/1986 | Malatesta et al. | |
| 4,695,560 A | 9/1987 | Gattuso et al. | |
| 4,897,175 A * | 1/1990 | Bricker | C10G 45/22 |
| | | | 208/143 |
| 6,458,902 B1 * | 10/2002 | Okazaki | C08F 8/04 |
| | | | 526/346 |
| 7,196,034 B1 * | 3/2007 | Kramer | C10G 45/06 |
| | | | 208/143 |
| 2002/0151746 A1 * | 10/2002 | Scates | C07C 51/47 |
| | | | 562/519 |
| 2009/0318739 A1 * | 12/2009 | Liu | B01J 37/0009 |
| | | | 585/277 |

FOREIGN PATENT DOCUMENTS

| | | | |
|---|---|---|---|
| CN | 102002130 | * | 4/2011 |
| CN | 104588024 | | 5/2015 |
| CN | 104941649 | | 9/2015 |
| CN | 103724544 | | 3/2016 |
| CN | 107876056 | | 4/2018 |
| CN | 108003291 | | 5/2018 |
| CN | 108003292 | | 5/2018 |
| CN | 108017760 | | 5/2018 |
| CN | 105585665 | | 6/2019 |
| CN | 111527184 | | 8/2020 |
| EP | 0260001 | | 3/1988 |
| EP | 3733820 | | 11/2020 |
| JP | S63-092611 | | 4/1988 |
| JP | H04-227064 | | 8/1992 |
| JP | H05-287012 | | 11/1993 |
| JP | H09202810 | | 8/1997 |
| JP | H09268209 | | 10/1997 |
| JP | H1149424 | | 2/1999 |
| JP | H11286514 | | 10/1999 |
| JP | 2002-088116 | * | 3/2002 |
| JP | 2002173506 | | 6/2002 |

(Continued)

OTHER PUBLICATIONS

Translation of JP 2002-088116 (Year: 2002).*

(Continued)

*Primary Examiner* — Robert C Boyle
(74) *Attorney, Agent, or Firm* — LEX IP MEISTER, PLLC

(57) ABSTRACT

The invention relates to a method for preparing hydrogenated petroleum resin. More specifically, the invention relates to a method for preparing hydrogenated petroleum resin having aromaticity of 10% or more and exhibiting excellent color and thermal stability, through a hydrogenation reaction in a slurry reactor, using a selective hydrogenation catalyst having excellent selectivity to olefinic double bonds in petroleum resin.

16 Claims, No Drawings

(56) References Cited

FOREIGN PATENT DOCUMENTS

| | | |
|---|---|---|
| JP | 2002275212 | 9/2002 |
| JP | 3687079 | 8/2005 |
| JP | 2010-504188 | 2/2010 |
| JP | 4930741 | 5/2012 |
| JP | 2018-526482 | 9/2018 |
| KR | 10-2005-0010940 | 1/2005 |
| KR | 10-2009-0064455 | 6/2009 |
| KR | 10-2017-0003425 | 1/2017 |
| TW | 202027856 | 8/2020 |

OTHER PUBLICATIONS

Translation of CN 102002130 (Year: 2011).*
A. L. Tarasov et al., "Selective hydrogenation of 1,3pentadiene over mono and bimetallic sulfided Ni(Cu)—S/SiO2 catalysts", Russ. Chem.Bull., Int.Ed., vol. 65, No. 12, Dec. 2016.
Petrukhina N N et al: "Hydrogenation of petroleum resins in the presence of supported sulfide catalysts" Petroleum Chemistry, Pleiades Publishing, Moscow, vol. 58, No. 1, Feb. 2, 2018.
EPO, Search Report of EP 20818502.5 dated Jun. 5, 2023.

* cited by examiner

PREPARATION METHOD OF HYDROGENATED PETROLEUM RESIN

CROSS-REFERENCE TO RELATED APPLICATION(S)

This application claims the benefit of Korean Patent Application No. 10-2019-0065352 filed on Jun. 3, 2019 and Korean Patent Application No. 10-2020-0065848 filed on Jun. 1, 2020 with the Korean Intellectual Property Office, the disclosures of which are herein incorporated by reference in their entirety.

TECHNICAL FIELD

The invention relates to a method for preparing hydrogenated petroleum resin. More specifically, the invention relates to a method for preparing hydrogenated petroleum resin having aromaticity of 10% or more and exhibiting excellent color and thermal stability through a selective hydrogenation reaction.

BACKGROUND ART

In general, a hydrogenation process for organic compounds is a reaction applied to reduce a specific functional group, or converting an unsaturated compound into a saturated compound, and it may be applied for various compounds to reduce compounds having unsaturated functional groups such as ketone, aldehyde, imine, and the like into a compound such as alcohol, amine, and the like, or to saturate the unsaturated bond of an olefinic compound.

Lower olefins (namely, ethylene, propylene, butylenes and butadiene) and aromatic compounds (namely, benzene, toluene, xylene) are basic intermediate materials widely used in petrochemical and chemical industries. Thermal cracking or thermal decomposition of steam is the main type of processes for the formation of these materials in the presence of steam, and in the absence of oxygen. Raw materials may include petroleum gas and distillate such as naphtha, kerosene and gas oil. Wherein, by the thermal decomposition of naphtha, and the like, C4 fraction including ethylene, propylene, butane and butadiene, cracked gasoline (including benzene, toluene and xylene), cracked kerosene (fraction of C9 or more), cracked heavy oil (ethylene bottom oil) and hydrogen gas may be produced, and petroleum resin may be prepared by the polymerization from the fractions.

However, petroleum resin comprises double bonds of aromatic moieties (hereinafter referred to as 'aromatic double bonds') and double bonds of aliphatic moieties (hereinafter referred to as 'olefinic double bonds'), and the higher the content of olefinic double bonds, the lower the quality of petroleum resin. Wherein, if a hydrogenation process of adding hydrogen to olefinic double bonds is conducted, the unsaturated bonds may be saturated, color may brighten, and the odor unique to petroleum resin may be reduced, thereby improving qualities.

During the hydrogenation process of such petroleum resin, in order to control the content of aromatic double bonds, it is necessary to selectively hydrogenate olefinic bonds of the resin. The selective hydrogenation of the olefinic double bonds may be generally conducted by contacting hydrogen and a hydrogenation subject with a noble metal catalyst such as palladium(Pd), platinum(Pt), and the like, but the noble metal catalyst is very expensive and causes cost increase. However, in case non-noble metal, for example, nickel based catalyst is used, aromatic double bonds may be hydrogenated together with olefinic double bonds, and thus, it may be difficult to control the content of aromatic double bonds in petroleum resin.

DETAILED DESCRIPTION OF THE PRESENT DISCLOSURE

Technical Problem

In order to solve the problem, it is an object of the invention to provide a method for preparing hydrogenated petroleum resin that not only has aromaticity of 10% or more, but also exhibits excellent color and thermal stability.

Technical Solution

According to one embodiment of the invention, there is provided a method for preparing hydrogenated petroleum resin comprising the steps of: introducing a selective hydrogenation catalyst and hydrogen gas in a mixture of petroleum resin and a solvent and conducting a hydrogenation reaction, wherein the selective hydrogenation catalyst is a supported catalyst in which nickel and sulfur are supported on a carrier, and comprises nickel in the content of 40 to 80 wt %, based on the total weight of the selective hydrogenation catalyst, and the hydrogenated petroleum resin has aromaticity of 10% or more, and APHA value measured according to ASTM D1209 of 20 or less.

According to another embodiment of the invention, there is provided hydrogenated petroleum resin prepared by the above method, having aromaticity of 10% or more, and APHA value measured according to ASTM D1209 of 20 or less.

Advantageous Effects

According to the preparation method of the invention, hydrogenated petroleum resin having aromacitiy of 10% or more and exhibiting excellent color and thermal stability can be prepared, by conducting a hydrogenation reaction with high selectivity to olefinic double bonds, for petroleum resin having both aromatic double bonds and olefinic double bonds.

DETAILED DESCRIPTION OF THE EMBODIMENTS

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is mentioned that each constructional element is formed "on" or "above" each constructional element, it means that each constructional element is directly formed on each constructional element, or that other constructional elements may be additionally formed between each layer or on a subject or substrate.

Hereinafter, a method for preparing hydrogenated petroleum resin of the invention will be explained in more detail.

The method for preparing hydrogenated petroleum resin having aromaticity of 10% or more and APHA value measured according to ASTM D1209 of 20 or less comprises the steps of introducing a selective hydrogenation catalyst and hydrogen gas in a mixture of petroleum resin and a solvent and conducting a hydrogenation reaction, wherein the selective hydrogenation catalyst is a supported catalyst in which nickel and sulfur are supported on a carrier, and comprises nickel in the content of 40 to 80 wt %, based on the total weight of the selective hydrogenation catalyst.

In order to prepare petroleum resin comprising aromatic functional groups, it is very important to control the color and aromaticity of the final product and color value through a selective hydrogenation reaction.

In petroleum resin, selective hydrogenation is a reaction for selectively adding hydrogen to one of aromatic double bonds and olefinic double bonds existing in petroleum resin, and in order to prepare high quality petroleum resin, it is necessary to conduct selective hydrogenation only to olefinic double bonds rather than aromatic double bonds.

The higher the selectivity to olefinic bonds, the higher the content of aromatic double bonds, namely aromaticity of petroleum resin, and the aromaticity may be measured by NMR.

Although an APHA value showing the color property of petroleum resin is not necessarily proportional hereto, in general, it becomes low as the selectivity to olefinic bonds is higher, and the APHA value may be measured according to ASTM D1209. As the APHA value is lower, the resin becomes water white resin in which color and odor almost disappear, wherein the residual olefin content(NMR, % area) may be less than 0.1%.

In general, since a hydrogenation reaction using a non-selective hydrogenation catalyst hydrogenates both aromatic double bonds and olefinic double bonds, although aromaticity in the final product is high, color and thermal stability may be deteriorated because olefinic double bonds are included. To the contrary, in case olefinic double bonds are completely hydrogenated so as to improve color and thermal stability, aromatic double bonds are also hydrogenated together, and thus, aromaticity in the final product may decrease to less than 10%.

Meanwhile, the type of a reactor commercially widely used for a hydrogenation process is a fixed bed reactor, and the fixed bed reactor has an advantage in terms of low investment cost and operating cost. The fixed bed reactor conducts a hydrogenation process while penetrating liquid raw material together with water from the upper part to the lower part or from the lower part to the upper part in the reactor comprising a bed filled with a hydrogenation catalyst. The catalyst bed of the fixed bed reactor is filled with a catalyst in an amount sufficient for use for a long time such as several months or more than one year.

However, as a hydrogenation process progresses, the activity of a hydrogenation catalyst gradually decreases. Thus, at the beginning of a reaction, catalytic activity is high, and thus, products having low content of aromatic double bonds and excellent color may be obtained, but as time elapses, catalytic activity gradually decreases and conversion of a hydrogenation reaction gradually decreases, and thus, the content of aromatic double bonds increases and color and thermal stability are deteriorated.

Meanwhile, The decrease in catalytic activity is caused by various physical and chemical influences, for example, by block or loss of catalytically active regions due to thermal, mechanical or chemical treatment. And, at the beginning of the process, reaction rapidly progresses by raw materials of high concentration, and thus, reaction heat may be partially accumulated to generate hot spot. As sintering is generated by such hot spot, decrease in catalytic activity is further accelerated. Such decrease in catalytic activity induces decrease in overall reactivity and causes decrease in overall hydrogenation degree, selectivity and purity of the hydrogenation product, and thus, if catalytic activity is decreased below a certain level, the filled catalyst should be replaced. Wherein, since the catalyst cannot be replaced during the reaction in the fixed bed reactor, the catalyst should be replaced after completely stopping the reaction, thus involving heavy losses in industrial scale. And, it is fundamentally impossible to change the kind of catalyst during the reaction so as to control the selectivity of hydrogenation process.

The invention aims to solve the above complicated problems, and by using a catalyst capable of conducting hydrogenation with high selectivity to olefinic double bonds in the hydrogenation reaction of petroleum resin, and conducting hydrogenation using a slurry reactor instead of a fixed bed reactor, hydrogenated petroleum resin having aromaticity of 10% or more and exhibiting excellent color and thermal stability can be prepared.

Specifically, the method for preparing hydrogenated petroleum resin according to one embodiment of the invention mixes a hydrogenation subject of petroleum resin with a solvent, and introducing a selective hydrogenation catalyst and hydrogen gas to conduct a hydrogenation reaction.

The hydrogenation subject is a subject in need of selective hydrogenation, and for example, it may be petroleum resin (or non-hydrogenated petroleum resin) consisting of C5 or C9 petroleum fractions and by-products and combinations thereof through distillation, pretreatment and polymerization.

And, as the solvent, hydrocarbon solvents such as pentane, hexane, heptane, nonane, decane, cyclohexane, methylcyclohexane, benzene, toluene, or xylene, and the like may be used, but are not limited thereto.

The solvent may be used in the amount of 40 to 80 parts by weight, based on 100 parts by weight of the petroleum resin. If the amount of the solvent used is less than 40 parts by weight, viscosity may increase and thus there are concerns about deterioration of reactivity and process stability, and if it exceeds 80 parts by weight, there are concerns about deterioration of productivity and increase in solvent recovery energy, and the like. Preferably, the solvent may be used in the amount of 40 parts by weight or more, or 50 parts by weight or more, or 60 parts by weight or more, and 80 parts by weight or less, or 75 parts by weight or less, or 70 parts by weight or less, based on 100 parts by weight of petroleum resin.

The mixing of the petroleum resin and solvent is conducted in a slurry reactor, but may be conducted by common methods.

After mixing the petroleum resin and solvent, a selective hydrogenation catalyst is introduced into the reactor.

The selective hydrogenation catalyst is a supported catalyst comprising nickel(Ni) as active metal and sulfur(S) as a cocatalyst, in which the nickel and sulfur are supported on a carrier.

Throughout the specification, the catalyst comprising sulfur(S) together with nickel(Ni) is referred to as "a nickel-based selective hydrogenation catalyst" so as to distinguish it from other nickel catalysts, for example, a catalyst that comprises only nickel as active metal and does not comprise a cocatalyst, or a catalyst that comprises nickel as active metal and comprises a cocatalyst or compound other than sulfur.

In general, it is known that nickel catalysts have very low selectivity to olefinic bonds, and thus, are difficult to use for selective hydrogenation. However, since the hydrogenation catalyst according to one embodiment of the invention comprises sulfur as a cocatalyst, it exhibits high selectivity to olefinic double bonds. Specifically, since it comprises sulfur as a cocatalyst, although uses nickel, it significantly decreases a speed of hydrogenation to aromatic unsaturated bonds while maintaining a speed of hydrogenation to olefinic unsaturated bonds, thus enabling selective hydrogenation to olefinic unsaturated bonds.

And, the carrier may be one or more selected from silica ($SiO_2$), alumina ($Al_2O_3$) and magnesia, and in case supported on such a carrier, excellent catalytic activity may be exhibited due to improvement in the structural stability of the catalyst.

And, according to one embodiment of the invention, in the nickel-based selective hydrogenation catalyst of the above construction, the catalytic activity and selectivity may be further improved by controlling the contents of constructional components and the properties.

Specifically, the selective hydrogenation catalyst may comprise nickel(Ni) in the content of 40 to 80 wt %, based on the total weight of the selective hydrogenation catalyst. If the content of nickel is less than 40 wt %, catalytic activity may be deteriorated, and thus, it may be difficult to realize APHA of the hydrogenated petroleum resin of 20 or less. And, if the content of nickel is greater than 80 wt %, it may not be easy to prepare a catalyst, and furthermore, catalyst selectivity may be deteriorated, and catalytic activity may be deteriorated due to decrease in dispersibility. Preferably, the selective hydrogenation catalyst may comprise nickel(Ni) in the content of 40 wt % or more, or 50 wt % or more, or 55 wt % or more, or 60 wt % or more, and 80 wt % or less, or 75 wt % or less, or 70 wt % or less, based on the total weight of the selective hydrogenation catalyst.

And, the selective hydrogenation catalyst may comprise sulfur(S) as a cocatalyst in the content of 0.1 to 20 wt %, based on the total weight of the selective hydrogenation catalyst. If the content of sulfur is less than 0.1 wt %, selective catalytic activity may decrease, and if it is greater than 20 wt %, dispersibility may decrease, and thus, selective catalytic activity may decrease. Preferably, the selective hydrogenation catalyst may comprise sulfur in the content of 0.1 wt % or more, or 0.5 wt % or more, or 1 wt % or more, or 3 wt % or more, or 4 wt % or more, and 20 wt % or less, or 10 wt % or less, or 7 wt % or less, or 5 wt % or less, based on the total weight of the selective hydrogenation catalyst.

And, in the nickel-based selective hydrogenation catalyst, the mole ratio(mole ratio of S/Ni) of sulfur to 1 mole of nickel may be 0.03 to 0.5. By comprising nickel and sulfur so as to fulfill the above mole ratio, selectivity to olefinic double bonds may be further increased. If the mole ratio of S/Ni is less than 0.03, selective catalytic activity may be deteriorated, and if the mole ratio is greater than 0.5, dispersibility may be deteriorated, and thus, selective catalytic activity may be lowered. More preferably, the mole ratio of S/Ni may be 0.03 or more, or 0.05 or more, or 0.1 or more, or 0.12 or more, and 0.5 or less, or 0.35 or less, or 0.3 or less, or 0.2 or less, or 0.15 or less.

And, the selective hydrogenation catalyst may comprise a carrier in the content of 10 to 50 wt %, based on the total weight of the selective hydrogenation catalyst. If the content of the carrier is less than 10 wt %, the improvement effect resulting from the inclusion of the carrier may not be sufficient, and if it is greater than 50 wt %, there is a concern about deterioration of catalytic activity due to relative decrease in the content of active metal and cocatalyst. Preferably, the selective hydrogenation catalyst may comprise the carrier in the content of 10 wt % or more, or 20 wt % or more, or 30 wt % or more, and 50 wt % or less, or 45 wt % or less, or 40 wt % or less, based on the total weight of the selective hydrogenation catalyst.

And, in the nickel-based selective hydrogenation catalyst, the average crystal size of nickel may be 1 to 10 nm, preferably 1 nm or more, or 3 nm or more, or 5 nm or more, and 10 nm or less, or 7 nm or less. If the average crystal size of nickel is within the above range, more excellent catalytic activity may be exhibited.

And, the selective hydrogenation catalyst may have average particle size of 1 to 20 μm, preferably 1 μm or more, or 3 μm or more, or 5 μm or more, and 20 μm or less, or 10 μm or less, or 7 μm or less. If the average particle size of the catalyst is within the above range, more excellent catalytic activity may be exhibited.

The nickel-based selective hydrogenation catalyst may be prepared by mixing a nickel compound and sulfur raw material in a solvent to prepare a precursor solution, and suspending a carrier in the precursor solution to precipitate nickel and sulfur on the carrier.

More specifically, first, a carrier and a nickel precursor are dissolved in distilled water to prepare a precursor solution. Wherein, the nickel precursor may include nickel, or metal salts such as nickel nitrate, acetate, sulfate, chloride, and the like, and more preferably, nickel chloride may be used.

The precursor solution is put in a precipitation vessel, and the temperature is raised to 50 to 120° C. while stirring. And then, into the temperature-raised precursor solution, a solution including a pH controlling agent and sulfur raw material is introduced for 30 minutes to 2 hours to induce precipitation, thus forming a supported catalyst in which nickel and sulfur are supported. As the sulfur raw material, one selected from copper nitrate, acetate, sulfate, chloride and hydroxide, or a mixture of two or more kinds may be used.

The supported catalyst is washed and filtered, and then, dried at 100 to 200° C. for 5 to 24 hours.

Thereafter, a step of reducing the dried catalyst at a temperature of 200 to 500° C., preferably 300 to 450° C. under hydrogen atmosphere to activate may be further conducted, and the activated supported catalyst may be immobilized with nitrogen mixed gas containing 0.1 to 20% oxygen to prepare powder catalyst.

However, the above preparation method is no more than one example, and the invention is not limited thereby.

The nickel-based selective hydrogenation catalyst may be in the form of powders, particles, or granules, and preferably, it may be in the form of powders.

The nickel-based selective hydrogenation catalyst prepared above, when used alone as a hydrogenation catalyst for petroleum resin, may exhibit high selectivity with aromaticity of the reaction product similar to noble metal catalysts.

According to another embodiment of the invention, during the hydrogenation reaction, a hydrogenation catalyst (hereinafter referred to as 'a second hydrogenation catalyst')

having different selectivity with the above selective hydrogenation catalyst may be further included.

Specifically, one or more hydrogenation catalysts selected from the group consisting of a selective hydrogenation catalyst comprising nickel and copper(Cu) as a cocatalyst; a selective hydrogenation catalyst comprising noble metal; and a non-selective hydrogenation catalyst of nickel metal may be further included, wherein the noble metal may be one or more selected from the group consisting of palladium (Pd), platinum(Pt), ruthenium(Ru) and rhodium(Rh).

And, in case the second hydrogenation catalyst is used, the introduction amount may vary according to the aimed aromaticity of the product, and is not specifically limited, but for example, it may be used in the amount of 0.1 to 10 parts by weight, based on 1 part by weight of the selective hydrogenation catalyst.

The prepared hydrogenation catalyst is introduced into a slurry reactor for hydrogenation, and hydrogenation subject of petroleum resin is introduced through a separate piping connected to the reactor and mixed.

As described above, by using a slurry type reactor that disperses catalyst particles in a reaction solution and reacts them, a certain amount of fresh catalyst may be introduced periodically during the reaction, and simultaneously, a certain amount of catalyst may be discharged, and thus, it may be easy to control the content of catalyst in the reactor. As the result, catalytic activity and selectivity may be maintained constantly. And, by controlling the amount of hydrogenation catalyst having high selectivity, hydrogenation to aromatic double bonds may be minimized, and hydrogenation to olefinic double bonds may be maximized, and thus, color and thermal stability of prepared hydrogenated petroleum resin may be easily improved. As the reactor, an autoclave type reactor equipped with a stirrer or a loop type reactor that mixes reaction fluid while circulating may be used according to mixing method.

And, the introduction of the hydrogenation catalyst into the slurry reactor may be one-time, periodic, non-periodic, or continuous, but any method may be adopted without limitations.

And, the hydrogenation catalyst may be introduced in the amount of 0.2 to 10 parts by weight, based on 100 parts by weight of the hydrogenation subject petroleum resin. If the introduction amount of the hydrogenation catalyst is too small, catalytic activity may not be properly exhibited, and if it is too large, productivity may be lowered compared to the introduction amount, and thus, it is preferable to introduce in the above range. Preferably, the hydrogenation catalyst may be introduced in the content of 0.2 parts by weight or more, or 1 part by weight or more, or 3 parts by weight or more, or 5 parts by weight or more, and 10 parts by weight or less, or 8 parts by weight or less, based on 100 parts by weight of the petroleum resin.

And, during the mixing, a solvent may be further introduced, and as the solvent, the above explained hydrocarbon solvents may be used.

Subsequently, hydrogen gas is introduced into the reactor and hydrogenation is conducted.

The hydrogenation temperature may be 150 to 250° C., preferably 150° C. or more, or 200° C. or more, and 250° C. or less. And, the pressure may be 20 to 100 bar, preferably 20 bar or more, or 50 bar or more, and 100 bar or less. If the hydrogenation temperature is less than 150° C., or the pressure is less than 20 bar, sufficient reaction may not occur, and if the hydrogenation temperature is greater than 250° C., or the pressure is greater than 100 bar, there are concerns about excessive reactions and production of by-products.

And, during the hydrogenation reaction, hydrogen gas may be continuously introduced so as to constantly maintain reaction pressure.

And, the preparation method according to one embodiment may further comprise the step of purging the inside of a slurry reactor comprising a hydrogenation catalyst and petroleum resin with inert gas such as nitrogen, argon, and the like, or reducing gas such as hydrogen before introducing the hydrogen gas. Preferably, a process of purging with inert gas such as nitrogen, and then, purging with hydrogen may be conducted. Wherein, the purge process may be conducted according to a common method, and it may be repeated one time or twice or more.

Since the preparation method according to one embodiment progresses a hydrogenation reaction in the above described slurry reactor, even when catalytic activity is lowered as the hydrogenation reaction progresses or a catalyst is needed to be replaced or added so as to control the aromaticity of the product, the introduced catalyst may be modified without need to stop the reaction, thus enabling a continuous reaction and constantly maintaining catalytic activity, thereby remarkably improving the efficiency of hydrogenation.

According to the preparation method of the invention, hydrogenated petroleum resin having aromaticity of 10% or more and exhibiting excellent color and thermal stability can be prepared. Specifically, the hydrogenated petroleum resin prepared according to the preparation method may have aromaticity measured by NMR analysis of 10% or more, or 12% or more, and less than 30%, or 25% or less, or 20% or less, or 15% or less, or 14% or less.

And, the hydrogenated petroleum resin may have APHA value measured according to ASTM D1209 of 20 or less, or 17 or less, or 15 or less. And, the lower the APHA, more preferable, and thus, the lower limit is not specifically limited, but for example, it may be 5 or more, or 10 or more.

And, the hydrogenated petroleum resin may have color number measured with Gardner color scale at 180° C. for 72 hours, of 13 or more, and 15 or less, or 14 or less.

Meanwhile, the hydrogenated petroleum resin prepared according to one embodiment may be used as a pressure sensitive adhesive and/or adhesive due to high aromaticity and excellent color and thermal stability as explained above.

Thus, according to another embodiment of the invention, there is provided hydrogenated petroleum resin prepared by the above preparation method, wherein aromaticity is 10% or more and APHA value measured according to ASTM D1209 is 20 or less, more specifically, aromaticity is 10% or more, and less than 30%, or 25% or less, or 20% or less, or 15% or less, or 14% or less, and APHA value measured according to ASTM D1209 is 20 or less, or 17 or less, or 15 or less, and 5 or more, or 10 or more, and color number measured with Gardner color scale after aging at 180° C. for 72 hours is 13 or more and 15 or less, or 14 or less.

Furthermore, according to yet another embodiment of the invention, there is provided a pressure sensitive adhesive, or adhesive comprising the above described petroleum resin.

Hereinafter, the invention will be explained in more detail through Examples and Comparative Examples, but these are presented for better understanding of the invention, and the scope of the invention is not limited thereby.

Preparation Example of Hydrogenated Catalyst

Preparation Example 1: Hydrogenated Catalyst(A)

50 ml of a solution in which 1 g of porous silica powders having a surface area of 200 m$^2$/g and a pore size of 28 nm and nickel chloride (243 g/l nickel) are dissolved in distilled water was introduced in a precipitation vessel, and a temperature was raised to 80° C. while stirring. After reaching 80° C., 40 ml of a solution containing sodium carbonate (175 g/l) and sodium sulfide (15 g/l) was completely introduced within 1 hour using a syringe pump. After precipitation was completed, the pH of the slurry was 7.7, and it was washed with 1.5 L of distilled water and filtered, and then, dried using a drying oven at 120° C. for 12 hours and more. It was subdivided, and then, reduced under a hydrogen atmosphere at 400° C. to activate. The activated catalyst was immobilized using nitrogen mixed gas containing 1% oxygen to prepare a hydrogenation catalyst.

In the immobilized catalyst, the content of nickel was 62.5 wt %, the content of sulfur was 4.5 wt %, and the content of silica carrier was 33 wt %, based on the total weight of the catalyst, and the mole ratio of sulfur/nickel was 0.13, the average crystal size of nickel was 5.1 nm, and the average particle size of the catalyst was 5 μm.

Preparation Example 2: Hydrogenated Catalyst(B)

5% Pd/Carbon powder catalyst(5R452, manufactured by Johnson Matthey) was prepared.

Preparation Example 3: Hydrogenated Catalyst(C)

Ni powder catalyst was prepared.

Hydrogenation Example

Hydrogenation was conducted using the catalysts prepared in Preparation Examples 1 to 3, as follows.

Example 1

Into a 1 L 1,600RPM high speed stirred batch type reactor, non-hydrogenated petroleum resin(DCPD polymerized petroleum resin) as raw material and a solvent Exxsol™ D40(manufactured by EXXONMOBIL CHEMICAL) were introduced at the weight ratio of 60:40, the catalyst(A) prepared in Preparation Example 1 was introduced into the reactor, and the reactor was fastened, followed by purge with 5 kg/cm$^2$ of N2 three times and purge with H$_2$ three time, thus controlling the reactor pressure to 10 bar. Wherein, the catalyst(A) was introduced in the amount of 8 parts by weight, based on 100 parts by weight of the non-hydrogenated petroleum resin.

As described in the following Table 1, the temperature inside of the reactor was raised to 250° C., and then, the reactor was pressurized to the reaction pressure of 90 bar, and hydrogenation was conducted. And, in order to maintain the reaction pressure at 90 bar during the hydrogenation reaction, hydrogen was continuously fed.

Example 2

A hydrogenation reaction was conducted by the same method as Example 1, except that the hydrogenated catalyst (A) of Preparation Example 1 and the hydrogenation catalyst (C) of Preparation Example 3 were mixed at the weight ratio of 10:90 and used instead of the catalyst(A), in Example 1.

Comparative Example 1

A hydrogenation reaction was conducted by the same method as Example 1, except that 0.5% Pd pellet type catalyst was used as a catalyst, a fixed bed reactor was used instead of the slurry reactor, and the reaction was conducted at a reaction temperature of 250° C., pressure of 90 bar, and residence time in the reactor of 2 hours.

Comparative Example 2

A hydrogenation reaction was conducted by the same method as Example 1, except that the catalyst(B) prepared in Preparation Example 2 was used instead of the catalyst(A) of Preparation Example 1, as described in the following Table 1.

Comparative Example 3

A hydrogenation reaction was conducted by the same method as Example 1, except that the catalyst(C) prepared in Preparation Example 3 was used instead of the catalyst(A) of Preparation Example 1, as described in the following Table 1.

Experimental Example

For the hydrogenation processes of Examples and Comparative Examples, olefinic bond selectivity test was conducted as follows, and the results were shown in the following Table 1.

(1) Measurement of Aromaticity (%)

The hydrogenation reaction products of Examples and Comparative Examples were dissolved in a solvent CDCl$_3$ at the concentration of 2.5 wt %, and then, 1H-NMR analysis (600 MHz) was conducted, and aromaticity (%) was calculated from the rate of the number of protons in aromatic region to the number of total protons of polymer, as shown in the following Mathematical Formula 1.

$$\text{Aromaticity (\%)} = \frac{Ar_A}{Ar_A + O_A + Al_A} \times 100 \quad \text{[Mathematical Formula 1]}$$

In the Mathematical Formula 1, $Ar_A$ is the number of protons calculated from the rate of the area of hydrogen peaks bonded to aromatic hydrocarbon, appearing in aromatic region, specifically, in the region of 6.0 to 9.0 ppm, $O_A$ is the number of protons calculated from the rate of the area of hydrogen peaks appearing in olefin region, specifically in the region of 4.0 to 6.0 ppm, and $Al_A$ is the number of protons calculated from the rate of the area of hydrogen peaks bonded to aliphatic hydrocarbon, appearing in aliphatic region, specifically, in the region of 0.1 to 4.0 ppm.

(2) Measurement of APHA Value

APHA values were measured according to ASTM D1209 for the reactants of hydrogenation processes of Examples and Comparative Examples.

The APHA value is proportional to olefin content in petroleum resin, and the more the olefinic bonds, the higher the APHA value, and the APHA value of petroleum resin before the hydrogenation process was 1,500.

(3) Evaluation of Thermal Stability(Ga # at 180° C., 72 Hours)

Thermal stability was evaluated according to ASTMD1544.

Specifically, 10 g of a sample was weighed in a test tube, and aged in an oven of 180° C. for 72 hours, and then, evaluated with Gardner color scale. Gardner color includes total 18 color standards, and in the Gardner color, a color most similar to the color of aged resin was found with unaided eyes, and the number of corresponding color was recorded.

TABLE 1

| | Kind of hydrogenation catalyst | Aromaticity (%) | APHA value | Ga# (at 180° C., 72 hours) |
|---|---|---|---|---|
| Example 1 | A | 14 | 15 | 14 |
| Example 2 | A + C | 10 | 10 | 13 |
| Comparative Example 1 | B (fixed bed reactor) | 9.5 | 25 | 17 |
| Comparative Example 2 | B | 15 | 25 | 16 |
| Comparative Example 3 | C | 1 | 10 | 12 |

Referring to Table 1, it was confirmed that when hydrogenated petroleum resin is prepared by the preparation method of the invention, aromaticity may be increased to 10% or more, while APHA value is as low as 20 or less. And, the hydrogenated petroleum resin prepared by the preparation method of the invention not only had high aromaticity of 10% or more, but also exhibited improved color and thermal stability.

The invention claimed is:

1. A method for preparing hydrogenated petroleum resin comprising the steps of:
   introducing a selective hydrogenation catalyst and hydrogen gas in a mixture of petroleum resin and a solvent and conducting a hydrogenation reaction,
   wherein the selective hydrogenation catalyst is a supported catalyst in which nickel and sulfur are supported on a carrier, and comprises nickel in the content of 40 to 80 wt %, based on the total weight of the selective hydrogenation catalyst, and
   the hydrogenated petroleum resin has aromaticity of 10 to 15%, APHA value measured according to ASTM D1209 of 10 to 20, and color number measured with Gardner color scale after aging at 180° C. for 72 hours of 13 to 15.

2. The method for preparing hydrogenated petroleum resin according to claim 1, wherein the mole ratio of sulfur to 1 mole of nickel is 0.03 to 0.5.

3. The method for preparing hydrogenated petroleum resin according to claim 1, wherein the carrier comprises silica, alumina, magnesia or a mixture thereof.

4. The method for preparing hydrogenated petroleum resin according to claim 1, wherein the carrier is comprised in an amount of 10 to 50 wt % based on the total weight of the selective hydrogenation catalyst.

5. The method for preparing hydrogenated petroleum resin according to claim 1, wherein the selective hydrogenation catalyst is used in the amount of 0.2 to 10 parts by weight, based on 100 parts by weight of the petroleum resin.

6. The method for preparing hydrogenated petroleum resin according to claim 1, wherein one or more hydrogenation catalysts selected from the group consisting of a selective hydrogenation catalyst comprising nickel and copper; a selective hydrogenation catalyst comprising noble metal; and a non-selective hydrogenation catalyst of nickel metal are further added during the hydrogenation reaction.

7. The method for preparing hydrogenated petroleum resin according to claim 6, wherein the one or more hydrogenation catalysts are comprised in an amount of 0.1 to 10 parts by weight, based on 1 part by weight of the selective hydrogenation catalyst which is the supported catalyst in which nickel and sulfur are supported on the carrier, and comprises nickel in the content of 40 to 80 wt %, based on the total weight of the selective hydrogenation catalyst.

8. The method for preparing hydrogenated petroleum resin according to claim 1, wherein the solvent is a hydrocarbon-based solvent selected from the group consisting of pentane, hexane, heptane, nonane, decane, cyclohexane, methylcyclohexane, benzene, toluene, xylene, and a mixture thereof.

9. The method for preparing hydrogenated petroleum resin according to claim 1, wherein the solvent is used in an amount of 40 to 80 parts by weight, based on 100 parts by weight of the petroleum resin.

10. The method for preparing hydrogenated petroleum resin according to claim 1, wherein the hydrogenation reaction is conducted in a slurry reactor.

11. The method for preparing hydrogenated petroleum resin according to claim 10, wherein the slurry reactor is an autoclave type reactor equipped with a stirrer or a loop type reactor circulating and mixing reaction fluid.

12. The method for preparing hydrogenated petroleum resin according to claim 1, wherein the hydrogenation reaction is conducted at a temperature of 150 to 250° C., and a pressure of 20 to 100 bar.

13. The method for preparing hydrogenated petroleum resin according to claim 1, wherein the hydrogenation reaction is conducted while continuously introducing hydrogen gas so as to maintain reaction pressure during the reaction.

14. Hydrogenated petroleum resin prepared by the method according to claim 1, having aromaticity of 10 to 15%, APHA value measured according to ASTM D1209 of 10 to 20, and color number measured with Gardner color scale after aging at 180° C. for 72 hours of 13 to 15.

15. A pressure sensitive adhesive comprising the hydrogenated petroleum resin according to claim 14.

16. An adhesive comprising the hydrogenated petroleum resin according to claim 14.

* * * * *